US010637240B2

(12) United States Patent
Mirzazad Barijough et al.

(10) Patent No.: US 10,637,240 B2
(45) Date of Patent: Apr. 28, 2020

(54) ENERGY CURTAILMENT EVENT IMPLEMENTATION BASED ON UNCERTAINTY OF DEMAND FLEXIBILITY

(71) Applicant: FUJITSU LIMITED, Kawasaki-shi, Kanagawa (JP)

(72) Inventors: Sanam Mirzazad Barijough, Mountain View, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 335 days.

(21) Appl. No.: 15/607,299

(22) Filed: May 26, 2017

(65) Prior Publication Data

US 2018/0342872 A1 Nov. 29, 2018
US 2019/0140450 A9 May 9, 2019

Related U.S. Application Data

(63) Continuation of application No. 14/163,964, filed on Jan. 24, 2014, now abandoned.

(51) Int. Cl.
*H02J 3/14* (2006.01)
*G05F 1/66* (2006.01)
(Continued)

(52) U.S. Cl.
CPC .................. *H02J 3/14* (2013.01); *G05F 1/66* (2013.01); *H02J 13/0017* (2013.01);
(Continued)

(58) Field of Classification Search
CPC ...... H02J 3/14; H02J 13/0062; H02J 13/0017; H02J 2003/146; H02J 2003/003; G05F 1/66
See application file for complete search history.

(56) References Cited

U.S. PATENT DOCUMENTS 7,644,005 B1 * 1/2010 Billiotte ........... G05B 19/41865
705/7.22
2004/0254899 A1 12/2004 Abe et al.
(Continued)

FOREIGN PATENT DOCUMENTS

JP 11-252019 A 9/1999

OTHER PUBLICATIONS

JP Office Action dated Jun. 29, 2018 in application No. 2014-228591.
(Continued)

*Primary Examiner* — Nathan L Laughlin
(74) *Attorney, Agent, or Firm* — Maschoff Brennan

(57) ABSTRACT

A system configured for curtailment event implementation based on uncertainty of energy demand flexibility of sites includes a processor and a non-transitory computer-readable medium communicatively coupled to the processor and having encoded therein programming code executable by the processor to perform operations. The operations may include receiving energy usage data from meters at sites and uncertainties of energy demand flexibility for each site. The uncertainties of energy demand flexibility of each site may be zero, may fit a single probability distribution, may fit a set of probability distributions, or may belong to a set of demand flexibilities. The operations may include clustering the sites based on the uncertainties. The operations may include solving group-specific formulations for groups. The operations may include identifying sites to include in the DR event using the solved-for group-specific parameters. The operations may include implementing the DR event at the identified sites to reduce energy usage.

20 Claims, 6 Drawing Sheets

(51) Int. Cl.
*H02J 13/00* (2006.01)
*H02J 3/00* (2006.01)

(52) U.S. Cl.
CPC .......... *H02J 13/0062* (2013.01); *H02J 3/003* (2020.01); *H02J 2310/64* (2020.01)

(56) References Cited

U.S. PATENT DOCUMENTS

| | | |
|---|---|---|
| 2009/0217326 A1 | 8/2009 | Hasek |
| 2010/0179704 A1* | 7/2010 | Ozog ............... G06Q 10/06315 700/291 |
| 2011/0231028 A1 | 9/2011 | Ozog |
| 2012/0232701 A1 | 9/2012 | Carty et al. |
| 2012/0323393 A1 | 12/2012 | Imhof et al. |
| 2014/0012429 A1 | 1/2014 | Dempster |
| 2016/0043548 A1* | 2/2016 | Bozchalui ............ G05B 13/041 700/291 |

OTHER PUBLICATIONS

JP Office Action dated Dec. 5, 2018 in application No. 2014-219537.
EP Summons to attend oral proceedings canceled in application No. 14182836.8 dated Sep. 27, 2018.
EP Examination in application No. 14182836.8 dated Oct. 1, 2018.
European Examination Report for corresponding European Patent Application No. 14182836.8, dated Dec. 19, 2016.
European Search Report for EP Application No. 14 18 2836, dated Apr. 23, 2015.
Brian K, Cherry. Pacific Gas and Electric. Electric schedule E-CBP, capacity bidding program. San Francisco, CA, May 1, 2013. http://www.pge.com/tariffs/tm2/pdf/ELEC_SCHEDS_E-CBP.pdf.
"Energy Efficiency in California: An Examination of the Viability of Demand Response Customers and the Effects of Peak Day Pricing" 2010. http://www.sfpower.org/pages/files/file10039.pdf.
A. Agnetis, G. Dellino, G. De Pascale, G. Innocenti, M. Pranzo, A. Vicino, "Optimization models for consumer flexibility aggregation in smart grids: The ADDRESS approach," 2011 IEEE First International Workshop on Smart Grid Modeling and Simulation (SGMS), pp. 96-101, 2011.
L. Gkatzikis, I. Koutsopoulos, T. Salonidis, "The role of the aggregators in smart grid demand response market," IEEE Journal on Selected Areas in Communication, pp. 1247-1257, 2013.
J. Dupačová, "Uncertainties in minimax stochastic programs," Optimization, vol. 60, pp. 10-11, 2011.
Y. Zhang, "General robust-optimization formulation for nonlinear programming," Journal of Optimization Theory and Applications, vol. 132, pp. 111-124, 2007.
EP Summons to attend oral proceedings in application No. 14182836.8 filed May 23, 2018.

* cited by examiner

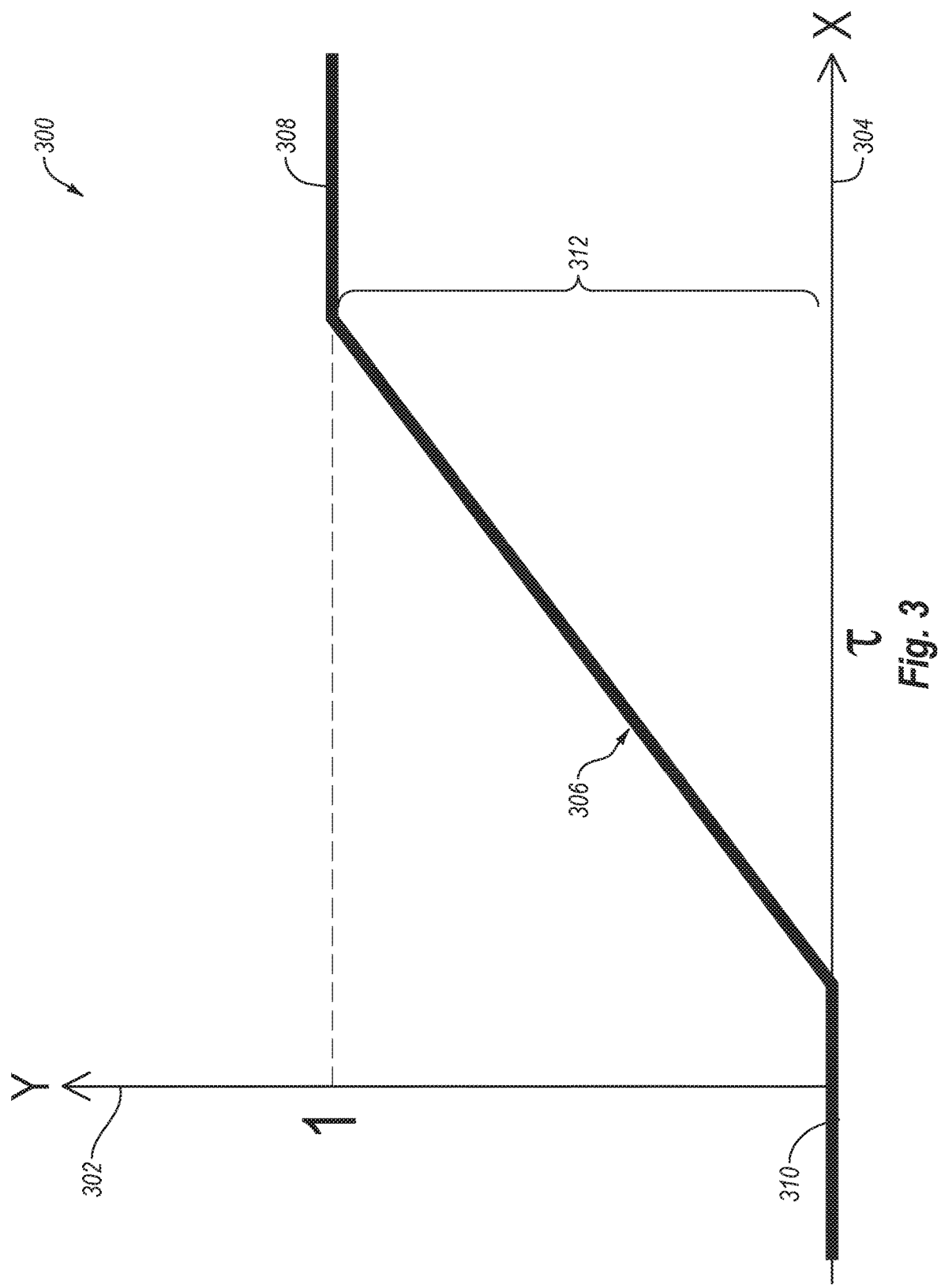

ENERGY CURTAILMENT EVENT IMPLEMENTATION BASED ON UNCERTAINTY OF DEMAND FLEXIBILITY

FIELD

The embodiments discussed herein are related to energy curtailment event implementation based on uncertainty of demand flexibility.

BACKGROUND

Utilities incentivize curtailment of energy usage during certain high load periods to increase the ability of the utilities to meet a larger demand or to minimize production costs. For example, in summer months, peak energy usage may occur on hot days in the late afternoon. A utility may offer an incentive to a factory to reduce energy usage during the late afternoon. In response, the factory may delay a high load production run until later in the evening, turn down the air-conditioning in the factory, or otherwise reduce energy use. In this manner, the utility may increase its ability to meet energy demands during the peak energy usage and/or avoid producing or purchasing additional energy to meet the energy demands.

The curtailment in energy usage during peak or high load periods may be referred to generally as demand response (DR). The energy usage curtailment during a specified time period may be referred to as a DR event. DR events generally occur when a utility expects a high demand and asks customers to reduce or curtail energy usage. When a customer reduces its energy usage by an agreed-upon amount, the utility may provide an incentive to the customer.

In some DR systems, DR aggregators mediate communication between utilities and customers. The DR aggregators generally have an agreement with the utilities to coordinate with the customers and implement DR events. Specifically, the DR aggregators identify customers that may participate in a DR event. The DR aggregators then notify the customer, assess whether the customer has complied with the energy curtailment of the DR event, and distribute incentives accordingly.

The subject matter claimed herein is not limited to embodiments that solve any disadvantages or that operate only in environments such as those described above. Rather, this background is only provided to illustrate one example technology area where some embodiments described herein may be practiced.

SUMMARY

An aspect of an embodiment includes an energy delivery system configured for energy curtailment event implementation and optimization based on uncertainty of energy demand flexibility of sites. The system may include one or more processors and a non-transitory computer-readable medium communicatively coupled to the one or more processors and having encoded therein programming code executable by the one or more processor to perform operations. The operations may include receiving, at the one or more processors, energy usage data from meters installed at a plurality of sites to which energy is supplied by the utility and measured by the meters. The operations may include receiving, at the one or more processors, uncertainties of energy demand flexibility for each site of the plurality of sites. The energy demand flexibility is an energy curtailment value that each of the sites is capable of curtailing during a DR event based on historical data of energy usage of the plurality of sites, DR event participation, and the received energy usage data from the meters. The uncertainties of energy demand flexibility of each site may be zero, may fit a single probability distribution, may fit a set of probability distributions, or may belong to a set of demand flexibilities. The operations may include clustering, by the one or more processors, a first subset of the plurality of sites having the uncertainty of zero into a first group, a second subset of the plurality of sites having the uncertainty that fits a single probability distribution into a second group, a third subset of the plurality of sites that have the uncertainty that fits a set of probability distributions into a third group, and a fourth subset of the plurality of sites having the uncertainty that belongs to a set of demand flexibilities into a fourth group. The operations may include solving, by the one or more processors, a first group-specific formulation for the first group; a second group-specific formulation for the second group, a third group-specific formula for the third group, and a fourth group-specific formulation for the fourth group. Each formulation of the group-specific formulations may be solved for group-specific parameters that relate to the subset of sites included in each of the four groups. The group-specific parameters may include one or more or a combination of a capacity profile of a DR program of the DR event, an energy usage profile of the subset of sites, and an element of a contract that defines a DR program in which the plurality of sites participate. The operations may include identifying, by the one or more processors, one or more sites of the plurality of sites to include in the DR event using at least one of the solved-for group-specific parameters for each of the four groups as an identification criterion. The operations may include implementing, by the one or more processors, the DR event at the one or more identified sites to reduce energy usage at the one or more identified sites consistent with the at least one of the solved-for group-specific parameters.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3 illustrates an example risk behavior plot that may be generated by the profitability system of FIG. 2B;

DESCRIPTION OF EMBODIMENTS

In an example embodiment, a DR event profitability module may enable a selection between an aggressive approach and a conservative approach of predicting DR event profitability. In the aggressive approach, an optimization engine may predict a DR event profitability disregarding energy flexibility uncertainty of one or more sites. Alternatively, in the conservative approach, the optimization engine may predict a DR event profitability taking into consideration the energy flexibility uncertainty of the sites.

In this and other embodiments, based on the energy flexibility uncertainty, each of the sites may be clustered into a corresponding one of multiple groups. There may be up to four groups in some embodiments. Each of the four groups may have associated therewith a group-specific formulation. Each of the formulations may include an optimization problem crafted for one of the four groups. Some of the formulations may be solved using stochastic approaches. Additionally or alternatively, some of the formulations may be converted to deterministic formulations using approaches such as Monte-Carlo analysis. After being converted to deterministic formulations, the formulations may be solved. The group-specific formulations may be solved for group-specific parameters that result in a specific profitability outcome. For example, for a first group, the group-specific formulation may be solved such that the group-specific parameters maximize the profitability of a DR event. Based on the group-specific parameters, the DR event profitability may be predicted. The DR event profitability predicted in this embodiment may include a maximum achievable profit value, a minimum achievable profit value, and a probability of obtaining a profit value between the maximum achievable profit value and the minimum achievable profit value.

Figure 1:
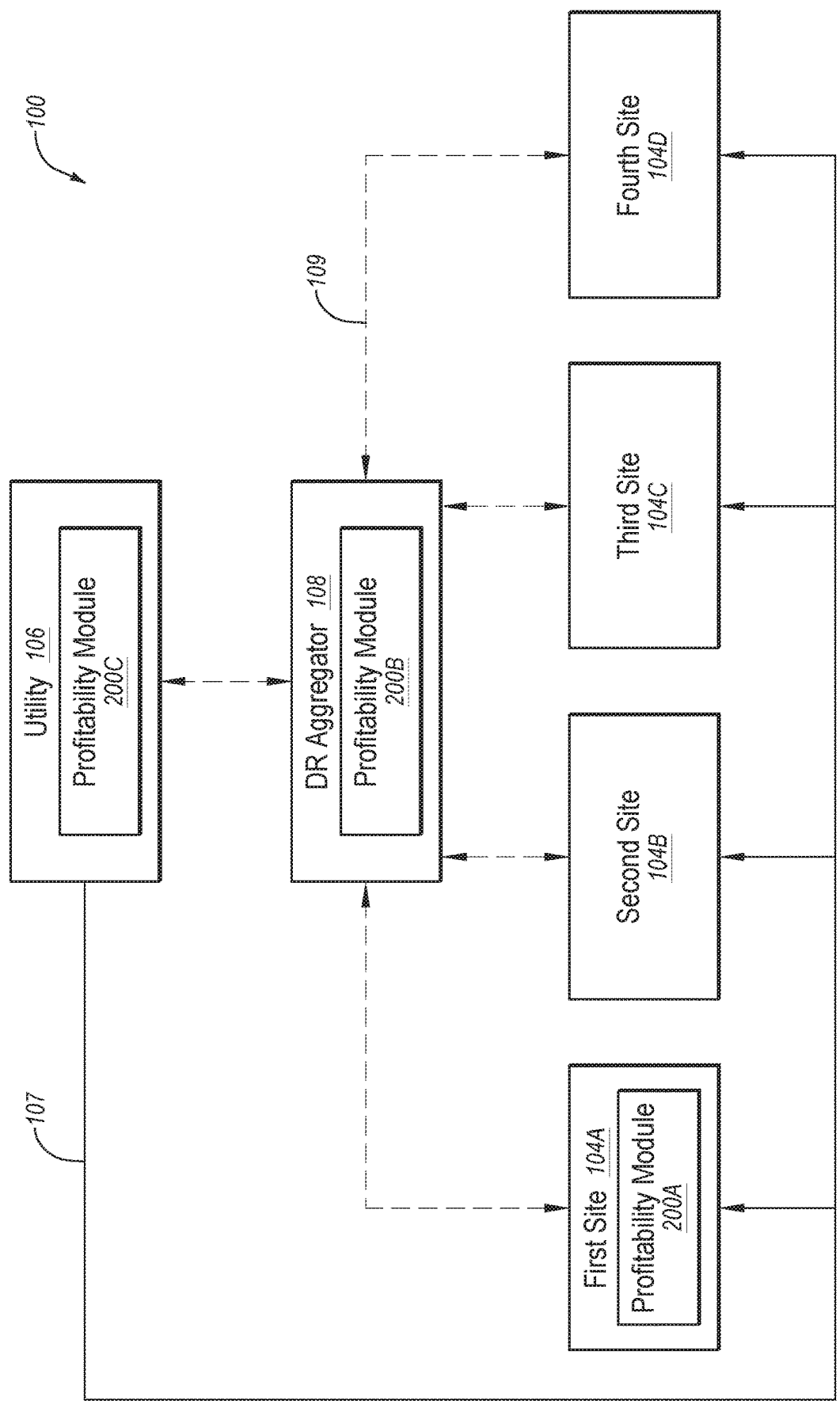
FIG. 1 is a block diagram of an example demand response (DR) system.

FIG. 1 is a block diagram of an example DR system 100, arranged in accordance with at least one embodiment described herein. The DR system 100 may be configured to enable prediction of DR event profitability and/or determination of one or more system parameters that may result in a profitable DR event. The system parameters may include or relate to a particular subset of sites 104A-104D (generally, site 104 or sites 104), a capacity profile of a DR program, a profile of one or more of the sites 104, an element of a contract defining a DR program, and the like.

In some embodiments, the DR system 100 may take into consideration demand flexibility uncertainty (hereinafter, "uncertainty") of the sites 104 in predicting the DR event profitability and/or determining the system parameters. The demand flexibility may include whether, and to what extent, the sites 104 may curtail energy usage. Data used to determine demand flexibility may be continuously or semi-continuously updated. By taking into consideration the demand flexibilities of the sites 104, the predictions regarding DR profitability and/or system parameters may account for any impact on profitability or the system parameters that the uncertainty may create. Additionally, the demand flexibilities may be updated, which may enable prediction of DR event profitability and/or determination of system parameters with updated demand flexibility data, thereby allowing the prediction of DR event profitability and/or determination of system parameters.

The DR profitability and/or the system parameters may be used to determine whether to participate in the DR event. Additionally, the DR profitability and/or the system parameters may be used to identify one or more of the sites 104 to manage as DR customers or to include in the DR system 100.

The DR system 100 may include a utility 106, a DR aggregator 108, and the sites 104. In the DR system 100, the utility 106 may distribute electricity or another resource, such as gas, water, or other resource(s), to the sites 104. The distribution of the resource by the utility 106 to the sites 104 is denoted in FIG. 1 at 107. The DR system 100 is described herein with particularity in which the utility 106 provides the electricity to the sites 104. In alternative embodiments, the DR system 100 may provide another resource to the sites 104.

The DR system 100 may at least partially enable implementation of DR events.

The DR events may include specified time periods during which one or more of the sites 104 curtail energy usage. Some DR events may include coordination of energy usage curtailment by multiple sites 104. A DR event may be scheduled during periods of high demand, for example. By curtailing energy usage during periods of high demand, the utility 106 may meet the high demand without purchasing or otherwise generating or locating additional energy. The utility 106 may offer an incentive to participate in the DR events.

The utility 106 may include any entity involved in production, transmission, and/or distribution of energy. The utility 106 may be publicly or privately owned. Some examples of the utility 106 may include a power plant, an energy cooperative, and an independent system operator (ISO). The utility 106 may be configured to identify a DR event and set terms for the DR event such as incentives, a time period, and overall energy usage curtailment.

In general, the sites 104 may include buildings, structures, equipment, or other objects that consume energy generated and/or managed by the utility 106. The sites 104 may include multiple types of structures ranging from private residences to large industrial factories or office buildings.

In these and other embodiments, the DR system 100 may include the DR aggregator 108. The DR aggregator 108 may act as an intermediary between the utility 106 and the sites 104 to coordinate implementation of one or more DR events. In particular, the DR aggregator 108 may coordinate DR events such that a cumulative energy usage curtailment of the sites 104 is sufficient to meet an overall energy usage curtailment of a DR event. In addition, the DR aggregators identify sites that efficiently contribute to curtailment involved in the DR event. In some embodiments, the incentive offered by the utility 106 may be received by the DR aggregator 108. The DR aggregator 108 may in turn offer some portion of the incentive to the sites 104 in exchange for participation in a DR event. The DR aggregator 108 may implement any DR incentive program including, but not limited to, a capacity bidding program (CBP) or a demand bidding program (DBP).

The sites 104 or some subset thereof may be managed by the DR aggregator 108. The DR aggregator 108 may specifically coordinate implementation of DR events by the sites 104 it manages. The DR aggregator 108 may accordingly be interested in identifying which of the sites 104 may have predictable demand flexibility during an upcoming DR event. The DR aggregator 108 may accordingly determine whether it is possible to meet an energy curtailment of the DR event.

The DR aggregator 108 may be communicatively coupled to the utility 106 and the sites 104. In FIG. 1, the communicative coupling between the DR aggregator 108, the utility 106, and the sites 104 is represented by dashed arrows. The dashed arrow between a fourth site 104D and the DR aggregator 108 is denoted at 109 in FIG. 1. The utility 106, the DR aggregator 108, and the sites 104 may be communicatively coupled via one or more wired or wireless networks. For instance, the networks may include the internet, mobile communication networks, one or more local area or wide area networks (LANs or WANs), any combination thereof, or any similar networking technology.

In the depicted embodiment, the DR aggregator 108 acts as an intermediary. However, inclusion of the DR aggregator 108 is not meant to be limiting. In some embodiments, the utility 106 may directly communicate with one or more of the sites 104. In these and other embodiments, the utility 106 may directly communicate with one or more sites 104 and the DR aggregator 108 may communicate with one or more other sites 104. For example, when one of the sites 104 uses substantial amounts of energy, the utility 106 may directly communicate with the site 104. In this example, the DR aggregator 108 may additionally communicate with others of the sites 104.

In the DR system 100, predicting DR event profitability and/or system parameters may be performed by one or more profitability modules 200A-200C (generally, profitability module 200 or profitability modules 200). A first profitability module 200A may be included in a first site 104A and/or any other of the sites 104, a second profitability module 200B may be included in the DR aggregator 108, a third profitability module 200C may be included in the utility 106, or any combination thereof. The profitability modules 200 may communicate information between the utility 106, the DR aggregator 108, the sites 104, or any combination thereof. Additionally, based on the information, one or more of the profitability modules 200 may predict DR event profitability and/or may determine system parameters. Moreover, following prediction of the DR event profitability and/or the determination of the system parameters, the profitability modules 200 may communicate information related to the DR event profitability and/or the system parameters to one or more of the utility 106, the DR aggregator 108, the sites 104, some other entity, or any combination thereof.

For example, in some embodiments, the first profitability module 200A included in the first site 104A may communicate historical data to the second profitability module 200B included in the DR aggregator 108. The historical data may pertain to demand flexibility of the first site 104A, for example. Additionally, the third profitability module 200C included in the utility 106 may communicate information related to a DR event to the second profitability module 200B. The second profitability module 200B may use the historical data and/or the information related to the DR event to predict the profitability of the DR event and/or to determine the system parameters that may result in a profitable DR event. The second profitability module 200B may then communicate information related to the predicted DR event profitability and/or the determined system parameters to one or more of the sites 104 and/or the utility 106.

The information related to the DR event profitability and/or the system parameters may enable a manager associated with the sites 104 to determine whether to participate in the DR event. Additionally or alternatively, the DR event profitability and/or the system parameters may enable a manager associated with the DR aggregator 108 to determine whether to participate in the DR event. Additionally or alternatively, the DR event profitability and/or the system parameters may enable the utility 106 and/or the DR aggregator 108 to identify whether a site 104 is a potential DR customer that may be beneficially included in the DR system 100.

Modifications, additions, or omissions may be made to the DR system 100 without departing from the scope of the present disclosure. For example, while FIG. 1 depicts a first, a second, a third, and a fourth site 104A-104D, the present disclosure applies to a DR system architecture having one or more sites 104. Furthermore, while FIG. 1 includes one DR aggregator 108 and one utility 106, the DR system 100 may include multiple DR aggregators and/or multiple utilities. Additionally, in some embodiments, one or more of the sites 104 may be served by multiple DR aggregators and/or multiple utilities.

Figure 2A:
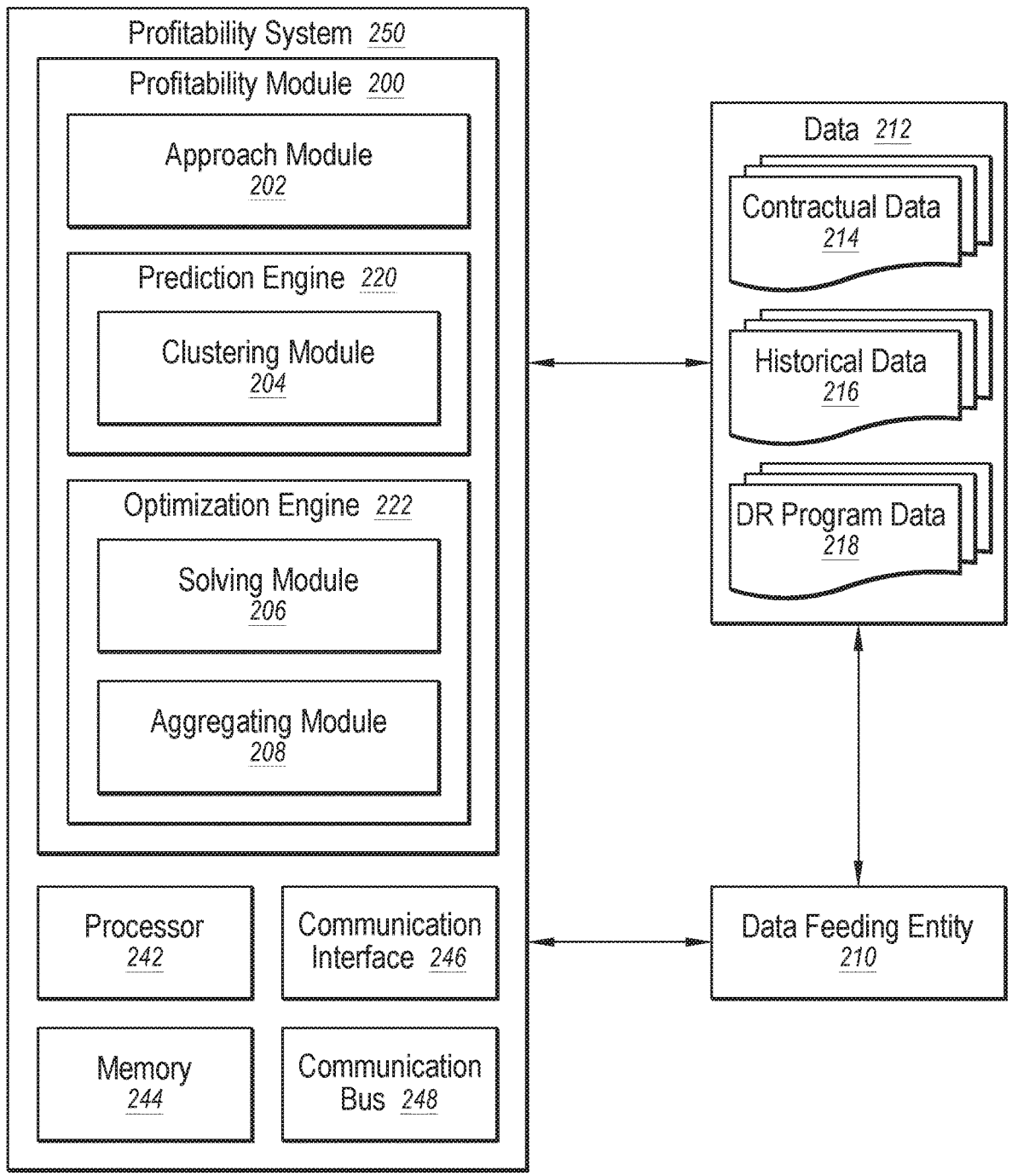
FIG. 2A is a block diagram of a profitability system that may be implemented in the DR system of FIG. 1.

FIG. 2A is a block diagram of a profitability system 250 that may be implemented in the DR system 100 of FIG. 1. For example, the profitability system 250 may represent a subsystem that may be included in one or more of the utility 106, the DR aggregator 108, or the sites 104. When implemented in the DR system 100 of FIG. 1, the profitability system 250 depicted in FIG. 2A may be configured to predict profitability of a DR event and/or to determine system parameters that may result in a profitable DR event.

The profitability system 250 generally provides a way in which historical data that includes some uncertainty may be analyzed to predict or determine a behavior. Thus, the profitability system 250 is not limited to implementations related to DR. For example, in some alternative embodiments, the profitability system 250 may be implemented to predict profitability and/or determine system parameters in systems that provide other types of resources (e.g., water or gas). Additionally or alternatively, the profitability system 250 may be implemented to predict profitability and/or determine system parameters with respect to productivity of workers at a site, productivity of a piece of machinery at a site, sales intensity (e.g., money spent or number of transactions) at a site such as a mall, or traffic patterns at a particular location. In each of these alternative implementations, the profitability system 250 and components thereof may function analogously to the manner described below.

As illustrated, the profitability system 250 may be configured to receive data 212 and to predict profitability for a DR event and/or determine system parameters based on the data 212 or some portion thereof. The profitability system 250 may include a processor 242, a communication interface 246, and a memory 244. The processor 242, the communication interface 246, and the memory 244 may be communicatively coupled via a communication bus 248. The communication bus 248 may include, but is not limited to, a memory bus, a storage interface bus, a bus/interface controller, an interface bus, or the like or any combination thereof.

In general, the communication interface 246 may facilitate communications over a network. The communication interface 246 may include, but is not limited to, a network interface card, a network adapter, a LAN adapter, or other suitable communication interface. The data 212 may be communicated to and/or from the profitability system 250 via the communication interface 246, for instance.

The processor 242 may be configured to execute computer instructions that cause the profitability system 250 to perform or control performance of the functions and operations described herein. The processor 242 may include, but is not limited to, a processor, a microprocessor (µP), a controller, a microcontroller (µC), a central processing unit (CPU), a digital signal processor (DSP), any combination thereof, or other suitable processor.

Computer instructions may be loaded into the memory 244 for execution by the processor 242. For example, the computer instructions may be in the form of one or more modules (e.g., modules 200, 202, 204, 206, and 208) and engines (e.g., engines 220 and 222). In some embodiments, data generated, received, and/or operated on during performance of the functions and operations described herein may be at least temporarily stored in the memory 244. Moreover, the memory 244 may include volatile storage such as RAM. More generally, the profitability system 250 may include a non-transitory computer-readable medium such as, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer-readable medium.

The profitability system 250 is depicted receiving the data 212. The data 212 may include, but is not limited to, historical data 216, contractual data 214, and DR program data 218. The historical data 216 may pertain to demand flexibility of one or more sites. For example, the historical data 216 may include past participation in DR events of a site, whether and to what degree the site successfully curtailed energy usage, energy curtailment possibilities during specific times, productivity (e.g., equipment productivity or site productivity) data, climate data, energy usage data, other information related to demand flexibility, or some combination thereof.

The contractual data 214 may include one or more terms of contracts involved in curtailment. For example, with combined reference to FIGS. 1 and 2A, the contractual data 214 may include terms of a contract between the DR aggregator 108 and the utility 106, between the utility 106 and the sites 104, between one or more of the sites 104 (e.g., contracts relating to a virtual power plant (VPP)), or between the DR aggregator 108 and the sites 104. Example terms may include, but are not limited to, an amount of energy curtailment, an incentive for compliance, whether the sites 104 or the DR aggregator 108 may opt out of a DR event, notification times, financial penalties for failure to satisfy a curtailment target, and the like.

The DR program data 218 may include specifics regarding the DR program in which the profitability system 250 is involved. For example, the DR program may include a CBP program. The CBP program may include requirements such as a meter type, a rate schedule, a maximum number of DR events within a time period, a notification schedule, a curtailment level, an incentive, a noncompliance penalty, an event trigger, a DR event frequency, a curtailment widow, a standby level, and the like. In some embodiments, the DR program data 218 and the contractual data 214 may overlap and/or may include some of the same information.

With continued reference to FIGS. 1 and 2A, the data 212 may be communicated from a data feeding entity 210. The data feeding entity 210 may include, but is not limited to, one or more of the sites 104, the DR aggregator 108, and the utility 106. Although a single entity is illustrated in FIG. 2A, more generally, one or more entities may provide the data 212 to the profitability system 250. Additionally, in some embodiments, the data feeding entity 210 may include an entity that tracks or measures the data 212, or some portion thereof, and communicates the data 212 to the profitability system 250. An example of the data feeding entity 210 that tracks a portion of the data 212 may include a climate measurement entity. Additionally, the data feeding entity 210 may update the data 212. For instance, energy usage data of a site 104 may be measured on an ongoing basis by a smart meter. Accordingly, the data 212 may include energy usage data recently measured and/or compiled from the smart meter.

The profitability module 200 may include a prediction engine 220 that may be configured to determine uncertainty for one or more sites (e.g., the sites 104 of FIG. 1). The prediction engine 220 may determine the uncertainty based on the data 212 or some subset thereof. Based on the uncertainty, a clustering module 204 may cluster the sites into one or more groups. The prediction engine 220 may additionally output one or more sets of information to an optimization engine 222. The optimization engine 222 may receive the sets of information from the prediction engine 220 and may predict DR event profitability and/or may determine system parameters.

In these and other embodiments, the optimization engine 222 may include a solving module 206 and an aggregating module 208. The solving module 206 may be configured to solve one or more group-specific formulations. In some embodiments, the group-specific formulations are each associated with the one or more groups. Solving the group-specific formulations may include solving for group-specific parameters that result in a specific profitability outcome. Some examples of the group-specific formulations, the specific profitability outcomes, and the group-specific parameters are described below.

The aggregating module 208 may be configured to aggregate or otherwise combine group-specific parameters and/or other solutions ascertained by the solving module 206. The aggregating module 208 may predict a DR event profitability and/or determine system parameters that result in a profitable DR event based on the group-specific parameters.

In some embodiments, the profitability system 250 may include an approach module 202. The approach module 202 may receive a selection between one or more levels of risk to incorporate in the prediction and/or the determination of the system parameters.

For example, the profitability system 250 may enable selection of an aggressive approach and a conservative approach. In this example, the aggressive approach configures the profitability module 200 to predict a highest profit obtainable for a DR event. Specifically, the clustering module 204 may cluster the sites into a single group. The single group generally disregards the uncertainty of the sites. Accordingly, the optimization engine 222 may predict the DR event profitability under an assumption that full information is available regarding the demand flexibilities of the sites even though some uncertainty may be present as determined by the prediction engine 220. The solving module 206 may then solve a group-specific formulation for group-specific parameters that result in a specific profitability outcome for the single group. In this example, the group-specific formulation may include a profitability maximizing formulation and the specific profitability outcome may include a maximization of DR event profitability.

In some embodiments, the profitability maximizing formulation may include:

$$\max_x [\text{revenue}(x, F) - \text{payment}(x, F)]$$
$$h(x, F) \leq 0$$

In the profitability maximizing formulation, the variable x represents group-specific parameters. The function max represents a maximizing function. The function h( ) represents one or more constraints on the group-specific parameters. The constraints may include constraints of the sites on their curtailment schedule, for example. The parameter F represents demand flexibility. In the profitability maximizing formulation, F includes real numbers. The function revenue( ) represents a revenue function. The function payment( ) represents a payment function.

The revenue function and/or the payment function may be based on the data 212. For example, with combined reference to FIGS. 1 and 2A, the revenue function and/or the payment function may be based on the contractual data 214 stemming from one or more contracts between the DR aggregator 108, the utility 106, and the sites 104. Additionally or alternatively, the revenue function may be based on the DR program data 218 that includes one or more specifics of a DR program in which the DR aggregator 108, the utility 106, and the sites 104 are involved.

With continued reference to FIGS. 1 and 2A, the complexity of the profitability maximizing formulation as well as other group-specific formulations described below may depend on the revenue function and/or the payment function. In an example scenario, the utility 106 may be a large electrical supply utility such as Pacific Gas and Electric (PG&E) and the DR aggregator 108 may be an independent DR aggregator such as Energy Curtailment Specialists (ECS). The utility 106 and the DR aggregator 108 may contract for a CBP DR program. In this scenario, the revenue function and/or the payment function may be reduced to a nonlinear integer program. For other DR programs (e.g., a DBP DR program), the payment function may be a linear integer program. In a DBP DR program, some simplifications may be implemented because in DBP and other DR programs the sites are not penalized for under performance.

The solving module 206 may solve for values of the group-specific parameters (x) at which the profitability maximizing formulation is maximized. Additionally, the solving module 206 may solve for a maximum predicted DR event profitability. In sum, the optimization engine 222 may output the group-specific parameters that result in a maximum DR profitability and a predicted maximum profitability. As calculated using the aggressive approach, the group-specific parameters and the predicted maximum profitability may not take into consideration the uncertainty of the sites. Accordingly, the outputs may be maximized, but a risk associated with the predicted DR profitability may be high compared to predictions that take into consideration uncertainty.

Additionally or alternatively, the profitability system 250 may enable selection of the conservative approach. Generally, the conservative approach configures the profitability module 200 to predict DR profitability and/or determine system parameters taking into consideration uncertainty. In an example of the conservative approach, the prediction engine 220 may determine the uncertainty of one or more of the sites individually. Based on the uncertainty, the clustering module 204 may cluster the sites into one or more groups. Each of the groups may include a subset of sites each having a similar level of uncertainty.

The solving module 206 may solve a group-specific formulation associated with each of the groups. In each group, the solving module 206 may output group-specific parameters that solve the group-specific formulation for a specific profitability outcome.

The aggregating module 208 may aggregate or otherwise combine the group-specific parameters and/or other solutions determined by the solving module 206. Based on the group-specific parameters and/or the specific profitability outcomes, the profitability system 250 may predict DR profitability and/or system parameters that may result in a profitable DR event. Additionally, the profitability system 250 may output information related to the DR profitability and/or the determined system parameters to the data feeding entity 210.

In some embodiments, predictions output by the conservative approach may include a worst-case DR event profitability, which may incorporate essentially no risk. Accordingly, using the conservative approach, an actual DR event profitability may be greater than the predicted DR event profitability output by the profitability system 250.

Figure 2B:
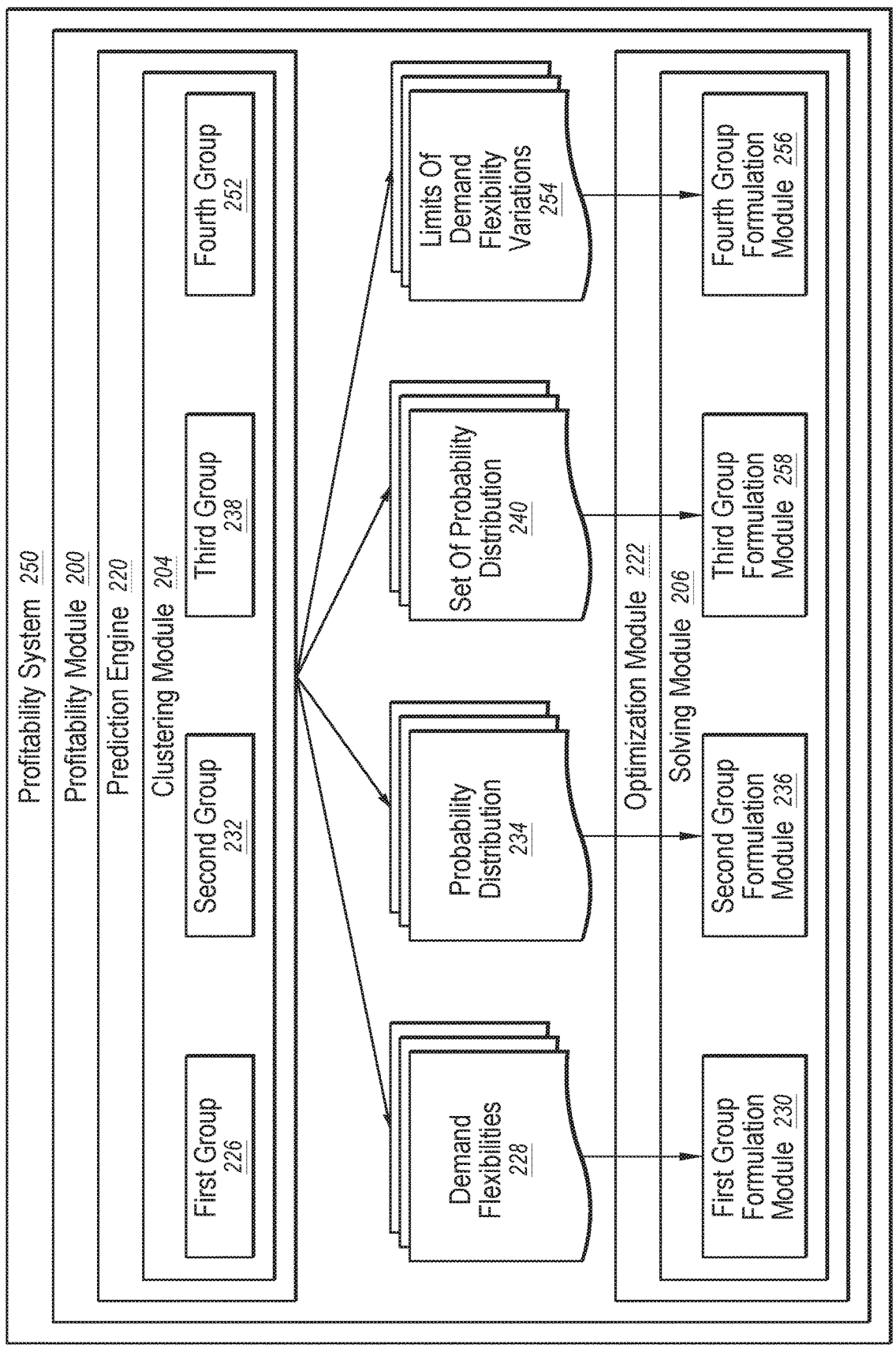
FIG. 2B is a block diagram of an example embodiment of the profitability system of FIG. 2A.

FIG. 2B is a block diagram of an example embodiment of the profitability system 250 of FIG. 2A in which the profitability module 200 clusters one or more sites (e.g., the sites 104 of FIG. 1) into four groups. FIG. 2B depicts a subset of the components (e.g., 200, 204, 206, 220, and 222) described with reference to FIG. 2A. Additionally, FIG. 2B depicts some additional components and/or features that may be included in the profitability system 250. Additionally, in some embodiments, FIG. 2B may be a representation of a conservative approach implemented in FIG. 2A.

In some alternative embodiments, the profitability system 250 may not include the approach module 202. In these and other embodiments, the profitability system 250 may be configured to predict DR event profitability and/or determine system parameters according to one of the aggressive approach or the conservative approach discussed above.

In the profitability system 250 illustrated in FIG. 2B, the prediction engine 220 determines four levels of uncertainty. An example of determining the four levels of uncertainty is discussed with reference to FIG. 5. The clustering module 204 may cluster the sites into four groups, each associated with a different one of the four levels of uncertainty.

A first group 226 may include a first subset of the sites in which the uncertainty is about zero. Having the uncertainty of about zero indicates that the prediction engine 220 may accurately predict a demand flexibility of the site. For example, there may be an amount of the data 212 of FIG. 2A pertaining to the sites in the first group 226 sufficient for the prediction engine 220 to determine that the demand flexibility of the first subset of sites is known.

For each of the sites included in the first group 226, the prediction engine 220 may output one or more demand flexibilities 228. For example, if a first site (e.g., the first site 104A of FIG. 1) is included in the first group 226, the output of the prediction engine 220 associated with the first site may include a value that represents a specific curtail amount, e.g., 10,000 kilowatts (kW). The demand flexibilities 228 may be received by a first group formulation module 230. The first group formulation module 230 may be included in the solving module 206 and may be configured to solve a group-specific formulation associated with the first group 226. The group-specific formulation associated with the first group 226 may include a profitability maximizing formulation. For example, in some embodiments, the profitability maximizing formulation may include:

$$\max_{x_{G1}} [\text{revenue}(x_{G1}, F) - \text{payment}(x_{G1}, F)]$$

$$h(x_{G1}, F) \le 0$$

In the profitability maximizing formulation, the variable $x_{G1}$ represents group-specific parameters associated with the first group 226. The functions max, h( ), revenue( ), and payment( ), represent the functions as described above with respect to the sites included in the first group 226. The parameter F represents demand flexibilities as described above. The profitability maximizing formulation for the first group 226 may be substantially similar to the profitability maximizing formulation for the single group described above. The similarity may be due to the sites in the first group 226 having substantially known demand flexibilities and the sites in the single group above are assumed to have known demand flexibilities.

The solving module 206 may also determine an expected profit from the first group 226 using the $x_{G1}$. In this and other embodiments, the expected profit may be determined according to the equation:

$$Pr_{G1} = \text{revenue}(x_{G1}, F) - \text{payment}(x_{G1}, F)$$

In the expected profit equation from the first group, the function $Pr_{G1}$ represents the expected profit from the first group 226. The functions revenue( ) and payment( ) represent the functions as described above.

A second group 232 may include a second subset of the sites in which the demand flexibilities are not substantially known. Instead, the uncertainty and/or expected demand flexibility fit a single probability distribution. For example, the data 212 of FIG. 2A pertaining to the sites in the second group 232 may be sufficient to know that the demand flexibility of a site will vary according to the single probability distribution.

For each of the sites included in the second group 232, the prediction engine 220 may output probability distributions 234. The output of the prediction engine 220 associated with each of the sites may include a representation of or parameters of the probability distribution to which the demand flexibility of each of the sites fit. The probability distribution may be different for each of the sites in the second group 232. For example, a first site and a second site (e.g., the first site 104A and the second site 104B of FIG. 1) may be included in the second group 232. In addition, the demand flexibility of the first site may fit a first Gaussian (or normal) distribution and the demand flexibility of the second site may fit a second Gaussian (or normal) distribution. Accordingly, the probability distributions 234 may include a representation of the first Gaussian distribution for the first site and a second representation of the second Gaussian distribution for the second site. Alternately or additionally, two or more sites in the second group 232 may have a common probability distribution 234.

The probability distributions 234 may be received by a second group formulation module 236. The second group formulation module 236 may be included in the solving module 206 and may be configured to solve a group-specific stochastic formulation associated with the second group 232. In some embodiments, the group-specific stochastic formulation associated with the second group 232 may include $$\max_{x_{G2}} E_F[\text{revenue}(x_{G2}, F) - \text{payment}(x_{G2}, F)]$$
$$E_F[h(x_{G2}, F)] \leq 0$$

In the formulation for the second group 232, the variable $x_{G2}$ represents group-specific parameters associated with the second group 232. The function $E_F[\ ]$ represents an expected value function for demand flexibilities. The functions max, h( ), revenue( ), and payment( ) represent the functions as described above. The parameter F represents demand flexibilities as described above. In some embodiments, to solve the group-specific stochastic formulation associated with the second group 232 a Monte-Carlo analysis of the profitability maximizing formulation for random demand flexibilities generated according to the probability distribution 234 output by the prediction engine 220 may be used.

The formulations for the second group 232 may include a stochastic programming problem. In some embodiments, the stochastic programming problem may be solved by a Monte Carlo analysis approach. As discussed above, in some circumstances the revenue function and/or the payment function may be reduced to a nonlinear integer program.

The solving module 206 may also determine an expected profit from the second group 232 using the $x_{G2}$. In this and other embodiments, the expected profit may be determined according to the equation:

$$Pr_{G2} = E_F[\text{revenue}(x_{G2}, F) - \text{payment}(x_{G2}, F)]$$

In the expected profit equation for the second group 232, the function $PR_{G2}$ represents the expected profit from the second group 232. The functions revenue( ) and payment( ) represent the functions as described above. The parameter $x_{G2}$ represents the variables as described above.

Similar to the expected profits ($Pr_{G1}$) for the first group 226, the formulations provided for the second group 232 may not be considered as a solution that accounts for risk by itself. For example, if all the sites are included in the second group 232, then the parameters associated with the second group 232 may still be considered as the solution with no risk.

A third group 238 may include a third subset of the sites in which the demand flexibility uncertainty fits a set of probability distributions, rather than a single probability distribution. For example, the data 212 of FIG. 2A pertaining to the sites in the third group 238 may be sufficient to know that the demand flexibility of a site will vary according to a set of probability distributions.

For each of the sites included in the third group 238, the prediction engine 220 may output a set of probability distributions 240. The output of the prediction engine 220 associated with each of the sites in the third group 238 may include a representation of or parameters of the set of probability distributions to which the demand flexibility of each of the sites fit. The sets of the probability distributions 240 may be different for each of the sites in the third group 238.

The sets of the probability distributions 240 may be received by a third group formulation module 258. The third group formulation module 258 may be included in the solving module 206 and may be configured to solve a group-specific formulation associated with the third group 238. In some embodiments, the group-specific formulation associated with the third group 238 may be a stochastic formulation. For example, the group-specific formulation associated with the third group 238 may include:

$$\max_{x_{G3}} E_F[\text{revenue}(x_{G3}, F) - \text{payment}(x_{G3}, F)]$$
$$E_F[h(x_{G3}, F)] \leq 0$$
$$p \in P$$
$$P = \{p : E_p g(F) = y\}$$

In the group-specific formulation associated with the third group 238, the variable $x_{G3}$ represents group-specific parameters associated with the third group 238. The variable p represents a probability distribution of the demand flexibility (F). The function g( ) and the parameter y are given (e.g., solved for by the prediction engine 220). The parameter P represents the set of probability distributions and may additionally describe a level of available information regarding the demand flexibilities of the sites in the third group 238. The function $E_F[\ ]$ represents an expected value function for probability distributions. The parameter F and the functions max, h( ), revenue( ), and payment( ) are described above.

In some embodiments, the group-specific formulation associated with the third group 238 may not be solved exactly. Accordingly, in these and other embodiments, the group-specific formulation associated with the third group 238 may include a hedge against worst-case expected profitability that may result from the sets of the probability distributions 240 output by the prediction engine 220. The group-specific formulation associated with the third group 238 may include:

$$\max_{x_{G3}} \min_{p \in P} E_F[\text{revenue}(x_{G3}, F) - \text{payment}(x_{G3}, F)]$$

$$\min_{p \in P} E_F[h(x_{G3}, F)] \leq 0$$

In the group-specific formulation associated with the third group 238, the function min represents a minimizing function. The functions $E_F$, revenue( ), payment( ), h( ), and max and the variables P, p, F, and $x_{G3}$ are described above.

The solution of the inner problem (e.g., the minimization problem) may depend on specifications of the set of probability distributions (P). For example, under some mild conditions (e.g., the set of probability distributions being a convex and compact set), the inner problem may be formulated as a linear program.

The solving module 206 may also determine an expected profit from the third group 238 using the $x_{G3}$. In this and other embodiments, the expected profit may be determined according to the equation:

$$Pr_{G3} = \text{revenue}(x_{G3}, F_{G3}) - \text{payment}(x_{G3}, F_{G3})$$

In the expected profit equation for the third group 238, the function $Pr_{G3}$ represents the expected profit from the third group 238. The variable $F_{G3}$ represents a solution to the inner problem. The functions revenue( ) and payment( ) represent the functions as described above. Additionally, $Pr_{G3}$ may represent worst-case profit generated by the third group 238. Accordingly, in these embodiments, as long as sites included in the third group 238 modify demand flexibilities within the sets of the probability distributions 240, the actual profit may not be lower than the expected profit ($Pr_{G3}$) determined according to the expected profit equation for the third group 238.

A fourth group 252 may include a fourth subset of the sites in which demand flexibilities of the fourth subset belong to a set of demand flexibilities. For example, the data 212 of FIG. 2A pertaining to the sites in the fourth group 252 may be sufficient to know that the demand flexibility of a site changes within a determined set of demand flexibilities. For each of the sites included in the fourth group 252, the prediction engine 220 may output limits of demand flexibility variations (limits) 254.

The limits 254 may be received by a fourth group formulation module 256. The fourth group formulation module 256 may be included in the solving module 206 and may be configured to solve a group-specific formulation associated with the fourth group 252. In some embodiments, the group-specific formulation associated with the fourth group 252 may include:

$$\max_{x_{G4}} [\text{revenue}(x_{G4}, F) - \text{payment}(x_{G4}, F)]$$

$$h(x_{G4}, F) \leq 0$$

$$F \in \zeta$$

In the group-specific formulation associated with the fourth group 252, the variable $x_{G4}$ represents group-specific parameters associated with the fourth group 252. The variable $\zeta$ is a set, which represents the limits on the flexibility variations for each customer that is generated by the prediction engine 220 from the data 202. The parameter F and the functions max, h( ), revenue( ), and payment( ) are described above.

In some embodiments, the group-specific formulation associated with the fourth group 252 may be a hard problem. Accordingly, in these and other embodiments, the group-specific formulation associated with the fourth group 252 may instead include a best solution of worst-case profitability resulting from the limits 254 output by the prediction engine 220. The group-specific formulation associated with the fourth group 252 may include:

$$\max_{x_{G4}} \min_{F \in \xi} [\text{revenue}(x_{G4}, F) - \text{payment}(x_{G4}, F)]$$

$$\min_{F \in \xi} [h(x_{G4}, F)] \leq 0$$

In the group-specific formulation associated with the fourth group 252, the functions: max, min, revenue( ), payment( ), and h( ), and the variables $\zeta$, F, and $x_{G4}$ are described above. In the group-specific formulation associated with the fourth group 252, an inner problem (e.g., the minimizing function) may be solved for one or more demand flexibilities (F) at which worst-case profitability occur. Additionally, an outer problem (e.g., the maximizing function) may be solved for the group-specific parameters associated with the fourth group 252 at which a best case (e.g., a maximum profitability) of the worst-case profitability occurs.

The solving module 206 may also determine an expected profit from the fourth group 252 using the $x_{G4}$. In this and other embodiments, the expected profit may be determined according to the equation:

$$Pr_{G4} = \text{revenue}(x_{G4}, F_{G4}) - \text{payment}(x_{G4}, F_{G4})$$

In the expected profit equation for the fourth group 252, the function $Pr_{G4}$ represents the expected profit from the fourth group 252. The variable $F_{G4}$ represents a solution to the inner problem. The functions revenue( ) and payment( ) represent the functions as described above. Like $Pr_{G3}$, the expected profit from the fourth group ($Pr_{G4}$) may represent a worst-case profit generated by the fourth group 252.

Referring back to FIG. 2A, after solving the group-specific formulations, the solving module 206 may communicate the group-specific parameters (e.g., $x_{G1}$, $x_{G2}$, $x_{G3}$, and $x_{G4}$) and/or the expected profits ($Pr_{G4}$, $Pr_{G2}$, $Pr_{G3}$, and $Pr_{G4}$) to the aggregating module 208. The aggregating module 208 may predict a DR event profitability based on the group-specific parameters and/or may determine one or more system parameters that result in a profitable DR event based on the group-specific parameters. Moreover, while four groups have been described above, in some embodiments there may be fewer groups for a given calculation. For instance, the sites in a DR event prediction calculation in some cases may only fall into one, two, or three of the four groups, in which case only one, two, or three group-specific parameters and corresponding expected profits may be calculated and may contribute to the prediction of a DR event profitability.

In some embodiments, the aggregating module 208 may determine the one or more system parameters based on an example system parameters equation:

$$x = \sum_{i=1}^{4} x_{Gi}$$

In the systems parameter equation, the variable x represents system parameters. The variable $x_{Gi}$ represents the group-specific parameters.

Additionally or alternatively, the aggregating module 208 may predict the DR event profitability according to an example DR event prediction equation:

$$Pr_{DR} = \sum_{i=1}^{4} Pr_{Gi}$$

In the DR event prediction equation, the variable $Pr_{DR}$ represents DR event profitability. The variable $Pr_{Gi}$ represents the expected profits from each of the groups 226, 232, 238, and 252. In some embodiments, the DR event profitability may represent a worst-case profit or a lower bound on the profit expected from a DR event with essentially no risk. Therefore, in this and other embodiments, losses may rarely or never occur so long as the demand flexibilities of the sites in the third group 238 change within admissible sets of the probability distributions 240 and the demand flexibilities of the sites in the fourth group 252 change within the set (ζ).

In some embodiments, the DR event profitability predicted in the profitability system 250 of FIG. 2B may enable calculation of a risk/profit relationship. For example, the profitability system 250 may enable calculation of a risk that a profit value will be below a selected profit value. FIG. 3 illustrates an example risk behavior plot 300 generated from an embodiment of the profitability system 250 of FIG. 2B in which the sites are clustered in the four groups 226, 232, 238, and 252 described above. The risk behavior plot 300 depicts a linear relationship between a risk 302 (plotted along the y-axis) and a profit value 304 (plotted along the x-axis). In other embodiments, the relationship between the risk 302 and the profit value 304 may be parabolic, exponential, logarithmic, or some other relationship With reference to FIG. 3, a risk of achieving a profit less than a selected profit value may be calculated. The risk behavior plot 300 includes an example DR event profitability curve (curve) 306. The curve 306 may include a maximum achievable profit value 308, a minimum achievable profit value 310, and a probability portion 312. The probability portion 312 may indicate a probability or risk of obtaining a profit value between the maximum achievable profit value 308 and the minimum achievable profit value 310.

In embodiments depicted in FIG. 2B including the four groups 226, 232, 238, and 252, calculation of the risk of obtaining a profit that is less than the selected profit may be based on the demand flexibility of the second group 232 because the second group 232 includes a single probability distribution of the demand flexibilities. Additionally, for the first group 226 the demand flexibilities are essentially known. Thus, no risk is involved in the profit associated to the first group 226. Additionally still, a worst-case profitability is calculated for the third group 238 and the fourth group 252. Thus, the probability portion 312 may be based on the single probability distribution of the second group 232.

Specifically, in some embodiments, values of the system parameters (x) described above may be fixed, and the values of the solutions to the inner problems of group-specific formulations for the third group 238 ($F_{G3}$) and the fourth group 252 ($F_{G4}$) may be fixed. With demand flexibilities fixed for the first group 226, total profits ($Pr_{DR}$) for a number of samples of the second group 232 may be calculated. With these total profits stored, the risk of obtaining a profit below a selected profit value (e.g., a value of τ in FIG. 3) may be calculated according to a risk calculation equation:

$$\rho = \frac{n_\tau}{n}$$

In the risk calculation equation, the variable n represents a number of samples for which the total profits is calculated. The variable ρ represents probability of the expected profit being less than the selected profit value. The variable $n_\tau$ is the number of samples for which the total profits are less than the selected profit value.

Figure 4:
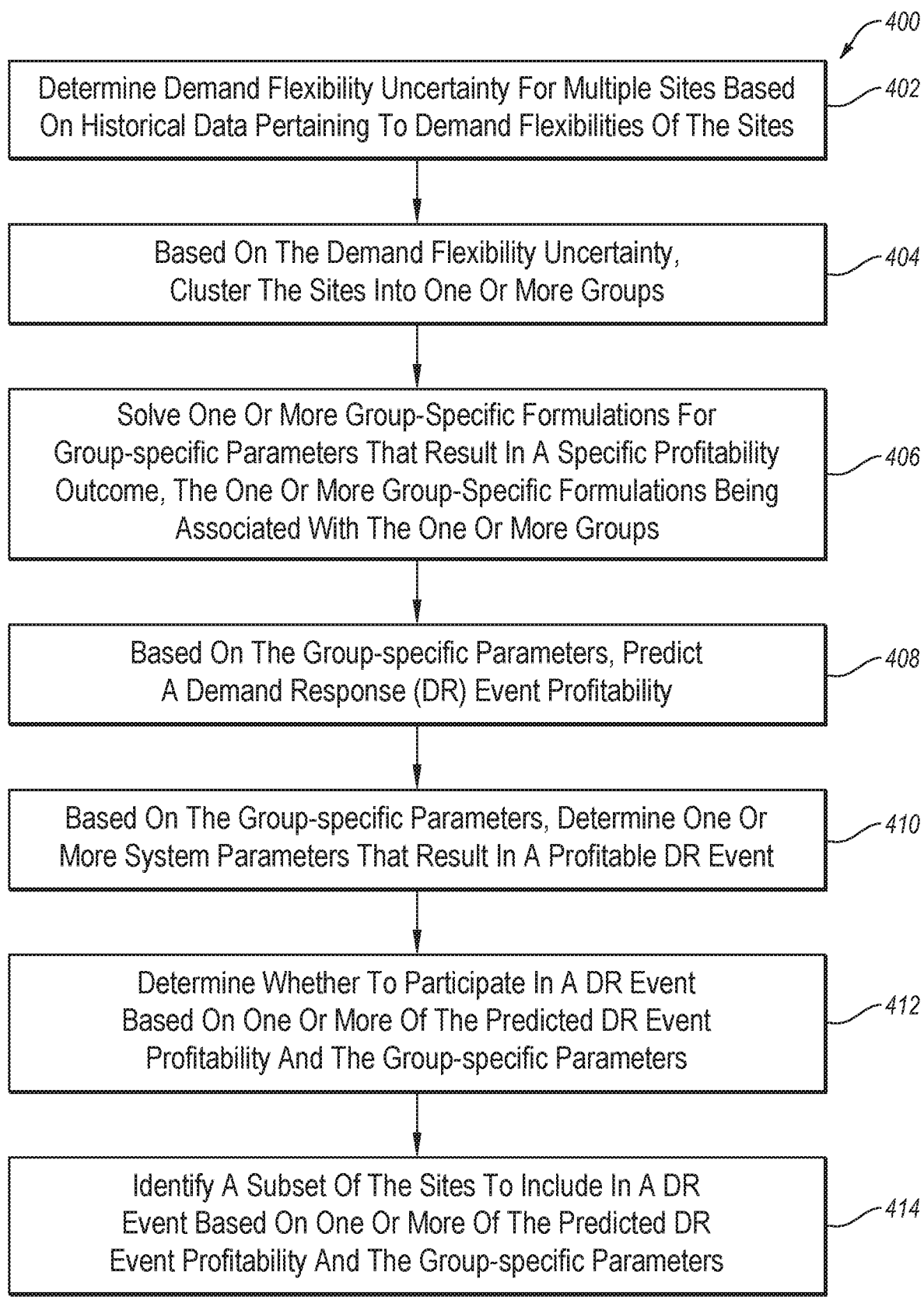
FIG. 4 a flow diagram of an example method of predicting DR event profitability and/or determining system parameters.

FIG. 4 is a flow diagram of an example method of predicting DR event profitability and/or determining system parameters, arranged in accordance with at least one embodiment described herein. The method 400 may be performed in a DR system such as the DR system 100 of FIG. 1 in which the utility 106 provides energy to the sites 104. Similar methods may be implemented to predict profitability and/or system parameters of systems that provide other resources.

The method 400 may be programmably performed in some embodiments by the profitability system 250 described with reference to FIGS. 2A and 2B and/or by one or more of the utility 106, the DR aggregator 108, and the sites 104 of FIG. 1. In some embodiments, the profitability system 250 may include or may be communicatively coupled to a non-transitory computer-readable medium (e.g., the memory 244 of FIG. 2A) having stored thereon programming code or instructions that are executable by a computing device (such as the processor 242) to cause the computing device to perform the method 400. Additionally or alternatively, the profitability system 250 may include the processor 242 described above that is configured to execute computer instructions to cause a computing system to perform the method 400. Although illustrated as discrete blocks, various blocks may be divided into additional blocks, combined into fewer blocks, or eliminated, depending on the desired implementation.

The method 400 may begin at block 402 in which a demand flexibility uncertainty for multiple sites may be determined. The demand flexibility uncertainty may be determined based on historical data pertaining to demand flexibilities of the sites. At block 404, the sites may be clustered into one or more groups. For example, the sites may be clustered according to the demand flexibility uncertainty. In some embodiments, the sites may be clustered into a single group based on disregarding the demand flexibility uncertainty. In some other embodiments, the one or more groups include a first group, a second group, a third group, and a fourth group, or some combination thereof. The first group may include a first subset of the sites in which the demand flexibility uncertainty is about zero. The second group may include a second subset of the sites in which the demand flexibility uncertainty fits a single probability distribution. The third group may include a third subset of the sites in which the demand flexibility uncertainty fits a set of probability distributions. The fourth group may include a fourth subset of the sites in which demand flexibilities of the fourth subset belong to a set of demand flexibilities.

At block 406, one or more group-specific formulations may be solved for group-specific parameters that result in a specific profitability outcome. The one or more group-specific formulations may be associated with the one or more groups. In some embodiments, the one or more group-specific formulations may include a profitability maximizing formulation, a Monte-Carlo analysis of the profitability maximizing formulation for random demand flexibilities generated according to the probability distribution, a hedge against worst-case expected profitability resulting from the set of probability distributions, a best solution of worst-case profitability resulting from the set of demand flexibilities, or some combination thereof.

At block 408, a DR event profitability may be predicted. For example, the DR event profitability may be predicted based on the group-specific parameters. In some embodiments, the DR event profitability may include a maximum achievable profit value, a minimum achievable profit value, and a probability of obtaining a profit value between the maximum achievable profit value and the minimum achievable profit value. In these and other embodiments, a selection of a particular profit value between the maximum achievable profit value and minimum achievable profit value may be received. After the selection of the particular profit value is received, a probability of obtaining a profit that is less than the particular profit value may be predicted.

At block 410, one or more system parameters may be determined that result in a profitable DR event. For example, the system parameters may be determined based on the group-specific parameters. In some embodiments, the group-specific parameters associated with each group may be summed to determine the system parameters.

At block 412, a determination may be made whether to participate in a DR event. The determination may be based on one or more of the predicted DR events profitability and the group-specific parameters. For example, with reference to FIG. 1, the DR aggregator 108 and/or one of the sites 104 may determine whether to participate in a DR event based on the predicted DR event profitability.

At block 414, a subset of the sites to include in a DR event may be identified. The subset of the sites to include in the DR event may be identified based on one or more of the predicted DR events profitability and the group-specific parameters. For example, with reference to FIG. 1, the DR aggregator 108 and/or the utility 106 may identify a subset of the sites 104 to include in the DR event.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 5:
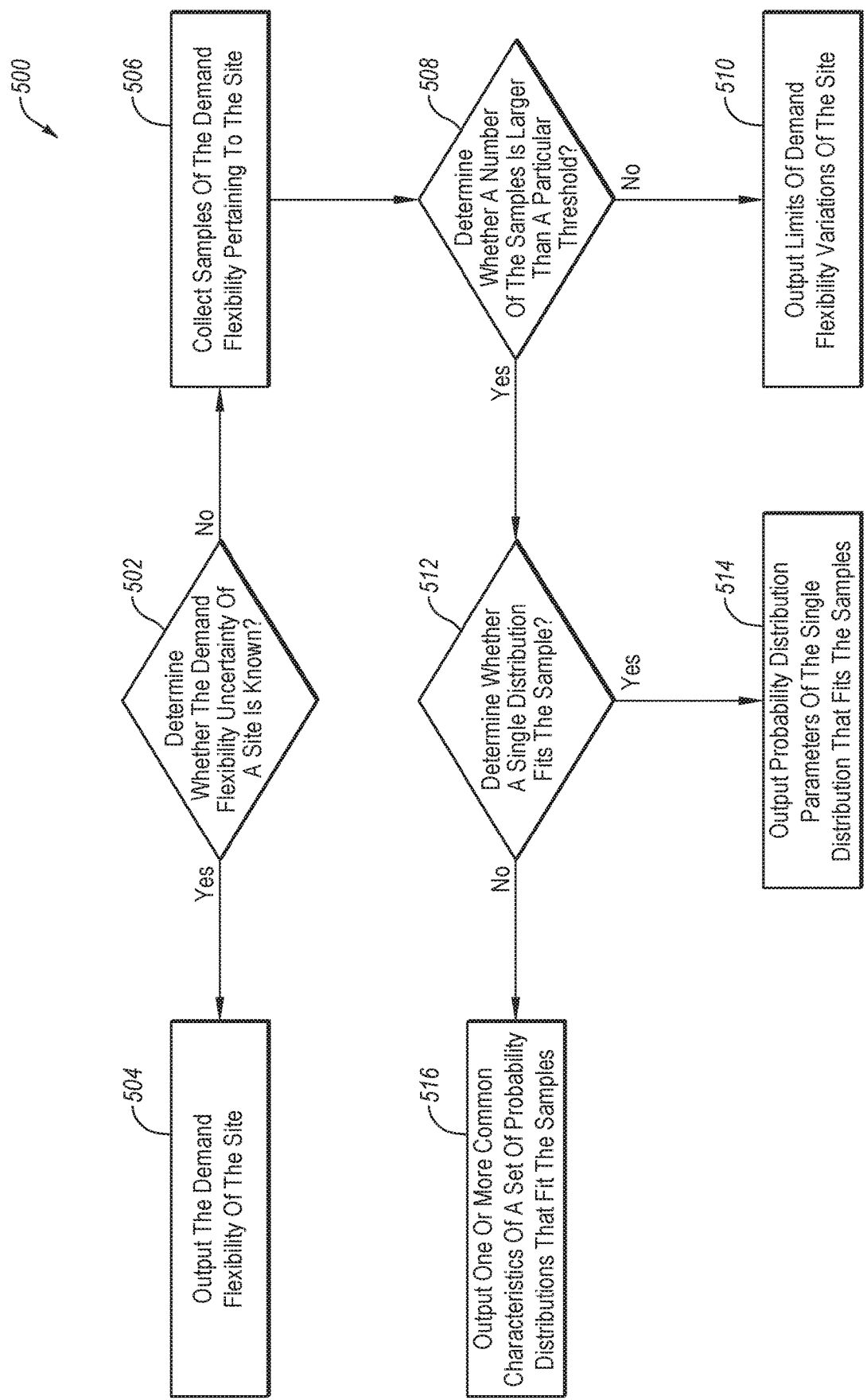
FIG. 5 is a flow diagram of an example method of determining demand flexibility uncertainty of one or more sites, all arranged in accordance with at least one embodiment described herein.

FIG. 5 is a flow diagram of an example method of determining the uncertainty of the demand flexibility of one or more sites, arranged in accordance with at least one embodiment described herein. The method 500 may be performed in a DR system such as the DR system 100 of FIG. 1 in which the utility 106 provides electricity to the sites 104. Similar methods may be implemented to determine uncertainty of other behaviors and/or to determine resource flexibility uncertainty in systems that provide resources other than electricity.

The method 500 may be programmably performed in some embodiments by the profitability system 250 described with reference to FIGS. 2A and 2B and/or by one or more of the utility 106, the DR aggregator 108, and the sites 104 of FIG. 1. In some embodiments, the profitability system 250 may include or may be communicatively coupled to a non-transitory computer-readable medium (e.g., the memory 244 of FIG. 2A) having stored thereon programming code or instructions that are executable by a computing device (such as the processor 242) to cause the computing device to perform the method 500. Additionally or alternatively, the profitability system 250 may include the processor 242 described above that is configured to execute computer instructions to cause a computing system to perform the method 500. In the profitability system 250 depicted in FIGS. 2A and 2B, the prediction engine 220 may perform the method 500. Although illustrated as discrete blocks, various blocks may be divided into additional blocks, combined into fewer blocks, or eliminated, depending on the desired implementation.

The method 500 may begin at block 502 at which it may be determined whether uncertainty of a site is known. For example, with reference to FIGS. 1, 2A, and 2B, the prediction engine 220 may receive data 212 pertaining to demand flexibilities of the sites 104. The prediction engine 220 may determine whether uncertainty of one or more of the sites 104 is known.

At block 504, in response to the uncertainty being known ("Yes" at block 502), the demand flexibility of the site may be output. For example, with reference to FIGS. 1 and 2B, the prediction engine 220 may output the demand flexibilities 228 of one of the sites 104 to the optimization engine 222 in response to a known uncertainty of the site 104.

Alternatively, at block 506, in response to the uncertainty not being known ("No" at block 502), samples of the demand flexibility pertaining to the site may be collected. For example, with reference to FIGS. 1 and 2A, the prediction engine 220 may collect samples of the data 212 pertaining to demand flexibility of the site 104 in response to a determination that the uncertainty of the site 104 is not known.

At block 508, it may be determined whether a number of the samples is larger than a particular threshold. The particular threshold may be defined to determine whether one or more probability distributions may be fit to the samples. For example, below the particular threshold, there may not be sufficient data to fit the samples to a probability distribution. Alternatively, above the particular threshold, there may be sufficient data to fit the samples to a single probability distribution or a set of probability distributions. A value of the particular threshold may be based on the particular probability distributions, the types of probability distributions, complexity of the DR system (e.g., contractual provisions, DR program types), the amount of samples available, and the like.

At block 510, limits of demand flexibility variations of the site may be output in response to the number of the samples being smaller than the particular threshold ("No" at block 508). At block 512, whether a single distribution fits the samples may be determined in response to the number of the samples being larger than the particular threshold ("Yes" at block 508). At block 514, in response to a single distribution fitting the samples ("Yes" at block 512), probability distribution parameters of the single distribution that fits the samples may be output. At block 516, in response to a single distribution not fitting the samples ("No" at block 512), one or more common characteristics of a set of probability distributions that fit the samples may be output.

For example, with reference to FIGS. 1, 2A, and 2B, the prediction engine 220 may output the limits 254 of the site 104 to the optimization engine 222 in response to the number of the samples being smaller than the particular threshold. Accordingly, in the embodiment depicted in FIG. 2B, when the number of the samples is smaller than the particular threshold, the site 104 may be clustered into the fourth group 252.

Alternatively, if the number of samples is larger than the particular threshold, the prediction engine 220 may determine whether the samples fit a single probability distribution or a set of probability flexibilities. When the samples fit a single probability distribution, the prediction engine 220 may output probability distributions 234 or one or more parameters thereof. Accordingly, in the embodiment depicted in FIG. 2B, when the number of the samples is larger than the particular threshold and the samples fit a single probability distribution, the site 104 may be clustered into the second group 232.

Alternatively, when the samples fit a set of probability distributions, the prediction engine 220 may output the sets of the probability distributions 240 or one or more parameters thereof. Accordingly, in the embodiment depicted in FIG. 2B, when the number of the samples is larger than the particular threshold and the samples fit a set of probability distributions, the site 104 may be clustered into the third group 238.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, or any other non-transitory storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module," "component," and/or "engine" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. An energy delivery system configured for energy curtailment event implementation and optimization based on uncertainty of energy demand flexibility of sites, the system comprising:
   one or more processors; and
   a non-transitory computer-readable medium communicatively coupled to the one or more processors and having encoded therein programming code executable by the one or more processor to perform operations comprising:
   receiving, at the one or more processors, energy usage data from meters installed at a plurality of sites to which energy is supplied by a utility and measured by the meters;
   receiving, at the one or more processors, uncertainties of energy demand flexibility for each site of the plurality of sites, wherein the energy demand flexibility is an energy curtailment value that each of the sites is capable of curtailing during a DR event based on historical data of energy usage of the plurality of sites, DR event participation, and the received energy usage data from the meters and wherein the uncertainties of energy demand flexibility of each site are zero, fit a single probability distribution, fit a set of probability distributions, or belong to a set of demand flexibilities;
   clustering, by the one or more processors, a first subset of the plurality of sites having the uncertainty of zero into a first group, a second subset of the plurality of sites having the uncertainty that fits a single probability distribution into a second group, a third subset of the plurality of sites that have the uncertainty that fits a set of probability distributions into a third group, and a fourth subset of the plurality of sites having the uncertainty that belongs to a set of demand flexibilities into a fourth group;

solving, by the one or more processors, a first group-specific formulation for the first group; a second group-specific formulation for the second group, a third group-specific formula for the third group, and a fourth group-specific formulation for the fourth group, wherein each formulation of the group-specific formulations is solved for group-specific parameters that relate to the subset of sites included in each of the four groups, and wherein the group-specific parameters include one or more or a combination of a capacity profile of a DR program of the DR event, an energy usage profile of the subset of sites, and an element of a contract that defines a DR program in which the plurality of sites participate;

identifying, by the one or more processors, one or more sites of the plurality of sites to include in the DR event using at least one of the solved-for group-specific parameters for each of the four groups as an identification criterion; and implementing, by the one or more processors, the DR event at the one or more identified sites to reduce energy usage at the one or more identified sites consistent with the at least one of the solved-for group-specific parameters.

2. The system of claim 1, wherein:
a group-specific formulation associated with the first group includes a maximizing formulation;
a group-specific formulation associated with the second group includes a Monte-Carlo analysis of the maximizing formulation for random demand flexibilities generated according to the probability distribution;
a group-specific formulation associated with the third group includes a hedge against worst-case expectation resulting from the set of probability distributions; and
a group-specific formulation associated with the fourth group includes a best solution of worst-case formulation resulting from the set of demand flexibilities.

3. The system of claim 2, wherein the group-specific formulation for the first group includes:

$$\max_{x_{G1}} [\text{revenue}(x_{G1}, F) - \text{payment}(x_{G1}, F)], \text{ and}$$

$$h(x_{G1}, F) \leq 0; \text{ in which:}$$

max represents a maximizing function;
$X_{G1}$ represents group-specific parameters associated with the first group;
F represents energy demand flexibility of the first subset of the plurality of sites in the first group;
h( ) represents one or more constraints based on one or more contracts and the DR program implemented in by the utility or a DR aggregator;
revenue( ) represents a revenue function that is based on one or more of the DR program and contracts between the DR aggregator, a utility, and the first subset of the plurality of sites; and
payment( ) represents a payment function based on the one or more contracts and the DR program.

4. The system of claim 3, wherein the group-specific formulation for the second group includes:

$$\max_{x_{G2}} E_F [\text{revenue}(x_{G2}, F) - \text{payment}(x_{G2}, F)], \text{ and}$$

$$E_F [h(x_{G2}, F)] \leq 0; \text{ in which:}$$

$E_F$ represents an expected value function for demand flexibilities; and
$X_{G2}$ represents group-specific parameters associated with the second group.

5. The system of claim 4, wherein the group-specific formulation for the third group includes:

$$\max_{x_{G3}} \min_{p \in P} E_F [\text{revenue}(x_{G3}, F) - \text{payment}(x_{G3}, F)], \text{ and}$$

$$\min_{p \in P} E_F [h(x_{G3}, F)] \leq 0; \text{ in which:}$$

min represents a minimizing function;
$X_{G3}$ represents group-specific parameters associated with the third group;
$\in$ represents a set-membership operator;
P represents the set of probability distributions; and
p represents a probability distribution.

6. The system of claim 5, wherein the group-specific formulation for the fourth group includes:
a group-specific formulation associated with the fourth group includes:

$$\max_{x_{G4}} \min_{F \in \xi} [\text{revenue}(x_{G4}, F) - \text{payment}(x_{G4}, F)], \text{ and}$$

$$\min_{F \in \xi} [h(x_{G4}, F)] \leq 0; \text{ in which:}$$

$X_{G4}$ represents group-specific parameters associated with the fourth group; and
$\zeta$ represents a set representing limits of flexibility variations.

7. The system of claim 1, wherein the operations further comprise:
determining whether the uncertainty of energy demand flexibility of a first site is known;
in response to the uncertainty of the first site being known, setting the uncertainty of energy demand flexibility of the first site to zero;
in response to the uncertainty of the site not being known, collecting samples of the energy demand flexibility pertaining to the site and determining whether a number of the samples is larger than a particular threshold;
in response to the number of the samples being smaller than the particular threshold, outputting limits of energy demand flexibility variations of the site;
in response to the number of the samples being larger than the particular threshold, determining whether a single distribution fits the samples;
in response to a single distribution fitting the samples, outputting probability distribution parameters of the single distribution that fits the samples; and
in response to a single distribution not fitting the samples, outputting one or more common characteristics of a set of probability distributions that fit the samples.

8. The system of claim 1, wherein the operations further comprise:
receiving a selection of an aggressive approach from an administrator of the utility or a DR aggregator;
in response to the received selection of the aggressive approach, disregarding the uncertainties in the energy demand flexibility;
clustering all sites of the plurality of sites into the first group; and implementing the DR event at all of the sites to reduce energy usage at the sites.

9. The system of claim 1, wherein the DR program includes a capacity bidding program (CBP) or a demand bidding program (DBP).

10. The system of claim 1, wherein the operations further comprise determining whether to participate in the DR event based on the group-specific parameters.

11. A method of optimization and implementation of an energy curtailment event based on uncertainty of energy demand flexibility, the method comprising:
   receiving, at a subsystem of a utility or of a demand response (DR) aggregator, energy usage data from meters installed at a plurality of sites to which energy is supplied by the utility and measured by the meters;
   receiving, at the subsystem, uncertainties of energy demand flexibility for each site of the plurality of sites, wherein the energy demand flexibility is an energy curtailment value that each of the sites is capable of curtailing during a DR event based on historical data of energy usage of the plurality of sites, DR event participation, and the received energy usage data from the meters and wherein the uncertainties of energy demand flexibility of each site are zero, fit a single probability distribution, fit a set of probability distributions, or belong to a set of demand flexibilities;
   clustering, by the subsystem, a first subset of the plurality of sites having the uncertainty of zero into a first group, a second subset of the plurality of sites having the uncertainty that fits a single probability distribution into a second group, a third subset of the plurality of sites that have the uncertainty that fits a set of probability distributions into a third group, and a fourth subset of the plurality of sites having the uncertainty that belongs to a set of demand flexibilities into a fourth group;
   solving, by the subsystem, a first group-specific formulation for the first group; a second group-specific formulation for the second group, a third group-specific formula for the third group, and a fourth group-specific formulation for the fourth group, wherein each formulation of the group-specific formulations is solved for group-specific parameters that relate to the subset of sites included in each of the four groups, and wherein the group-specific parameters include one or more or a combination of a capacity profile of a DR program of the DR event, an energy usage profile of the subset of sites, and an element of a contract that defines a DR program in which the plurality of sites participate;
   identifying, by the subsystem, one or more sites of the plurality of sites to include in the DR event using at least one of the solved-for group-specific parameters for each of the four groups as an identification criterion; and
   implementing, by the subsystem, the DR event at the one or more identified sites to reduce energy usage at the one or more identified sites consistent with the at least one of the solved-for group-specific parameters.

12. The method of claim 11, wherein:
   a group-specific formulation associated with the first group includes a maximizing formulation;
   a group-specific formulation associated with the second group includes a Monte-Carlo analysis of the maximizing formulation for random demand flexibilities generated according to the probability distribution;
   a group-specific formulation associated with the third group includes a hedge against worst-case expectation resulting from the set of probability distributions; and
   a group-specific formulation associated with the fourth group includes a best solution of worst-case formulation resulting from the set of demand flexibilities.

13. The method of claim 12, wherein the group-specific formulation for the first group includes:

$$\max_{x_{G1}}[\text{revenue}(x_{G1}, F) - \text{payment}(x_{G1}, F)], \text{ and}$$

$$h(x_{G1}, F) \leq 0; \text{ in which:}$$

max represents a maximizing function;
$X_{G1}$ represents group-specific parameters associated with the first group;
F represents energy demand flexibility of the first subset of the plurality of sites in the first group;
h( ) represents one or more constraints based on one or more contracts and the DR program implemented in by the utility or the DR aggregator;
revenue( ) represents a revenue function that is based on one or more of the DR program and contracts between the DR aggregator, a utility, and the first subset of the plurality of sites; and
payment( ) represents a payment function based on the one or more contracts and the DR program.

14. The method of claim 13, wherein the group-specific formulation for the second group includes:

$$\max_{x_{G2}} E_F[\text{revenue}(x_{G2}, F) - \text{payment}(x_{G2}, F)], \text{ and}$$

$$E_F[h(x_{G2}, F)] \leq 0; \text{ in which:}$$

$E_F$ represents an expected value function for demand flexibilities; and
$X_{G2}$ represents group-specific parameters associated with the second group.

15. The method of claim 14, wherein the group-specific formulation for the third group includes:

$$\max_{x_{G3}} \min_{p \in P} E_F[\text{revenue}(x_{G3}, F) - \text{payment}(x_{G3}, F)], \text{ and}$$

$$\min_{p \in P} E_F[h(x_{G3}, F)] \leq 0; \text{ in which:}$$

min represents a minimizing function;
$X_{G3}$ represents group-specific parameters associated with the third group;
$\in$ represents a set-membership operator;
P represents the set of probability distributions; and
p represents a probability distribution.

16. The method of claim 15, wherein the group-specific formulation for the fourth group includes:
a group-specific formulation associated with the fourth group includes:

$$\max_{x_{G4}} \min_{F \in \xi}[\text{revenue}(x_{G4}, F) - \text{payment}(x_{G4}, F)], \text{ and}$$

$$\min_{F \in \xi}[h(x_{G4}, F)] \leq 0; \text{ in which:}$$

$X_{G4}$ represents group-specific parameters associated with the fourth group; and ζ represents a set representing limits of flexibility variations.

17. The method of claim 11, further comprising:

determining whether the uncertainty of energy demand flexibility of a first site is known;

in response to the uncertainty of the first site being known, setting the uncertainty of energy demand flexibility of the first site to zero;

in response to the uncertainty of the site not being known, collecting samples of the energy demand flexibility pertaining to the site and determining whether a number of the samples is larger than a particular threshold;

in response to the number of the samples being smaller than the particular threshold, outputting limits of energy demand flexibility variations of the site;

in response to the number of the samples being larger than the particular threshold, determining whether a single distribution fits the samples;

in response to a single distribution fitting the samples, outputting probability distribution parameters of the single distribution that fits the samples; and in response to a single distribution not fitting the samples, outputting one or more common characteristics of a set of probability distributions that fit the samples.

18. The method of claim 11, further comprising:

receiving a selection of an aggressive approach from an administrator of the utility or the DR aggregator;

in response to the received selection of the aggressive approach, disregarding the uncertainties in the energy demand flexibility;

clustering all sites of the plurality of sites into the first group; and implementing the DR event at all of the sites to reduce energy usage at the sites.

19. The method of claim 11, wherein the DR program includes a capacity bidding program (CBP) or a demand bidding program (DBP).

20. The method of claim 11, further comprising determining whether to participate in the DR event based on the group-specific parameters.

* * * * *